United States Patent [19]

Köhler et al.

[11] Patent Number: 5,093,397
[45] Date of Patent: Mar. 3, 1992

[54] MIXTURES OF POLYARYLENE SULPHIDES, NITROARYLKETO COMPOUNDS, ELECTRON RICH AROMATIC COMPOUNDS, GLASS FIBRES AND OPTIONALLY OTHER FILLERS

[75] Inventors: Burkhard Köhler; Hans-Detlef Heinz, both of Krefeld, Fed. Rep. of Germany; Joachim Döring, Tokyo, Japan; Wolfgang Rüsseler, Krefeld, Fed. Rep. of Germany

[73] Assignee: Bayer Aktiengesellschaft, Leverkusen, Fed. Rep. of Germany

[21] Appl. No.: 754,447

[22] Filed: Sep. 3, 1991

[30] Foreign Application Priority Data

Sep. 14, 1990 [DE] Fed. Rep. of Germany ....... 4029168

[51] Int. Cl.$^5$ ................................................ C08K 5/32
[52] U.S. Cl. .................................... 524/259; 524/186; 524/609
[58] Field of Search ...................... 524/259, 186, 609

[56] References Cited

U.S. PATENT DOCUMENTS 4,996,256  2/1991  Heinz et al. .......................... 524/259

Primary Examiner—Morton Foelak
Attorney, Agent, or Firm—Connolly & Hutz

[57] ABSTRACT

This invention relates to mixtures of polyarylene sulphides, nitroarylketo compounds, electron rich aromatic compounds, glass fibres and optionally other fillers (additives). The mixtures are distinguished by good mechanical properties.

1 Claim, No Drawings

MIXTURES OF POLYARYLENE SULPHIDES, NITROARYLKETO COMPOUNDS, ELECTRON RICH AROMATIC COMPOUNDS, GLASS FIBRES AND OPTIONALLY OTHER FILLERS

This invention relates to mixtures of polyarylene sulphides, nitroarylketo compounds, electron rich aromatic compounds, glass fibres and optionally other fillers (additives). The mixtures are distinguished by good mechanical properties.

Polyarylene sulphides (PAS) are known (e.g. U.S.A. 3 354 129, EP-A 171 021). They are inert, high temperature resistant thermoplasts which can be filled with a high proportion of fillers such as glass fibres and/or other inorganic fillers. The use of these polymers, in particular of polyphenylene sulphide (PPS), is increasing in areas hitherto preserved for duroplasts.

PAS has unsatisfactory mechanical properties for certain applications in the field of injection moulding. In particular, the edge fibre elongation and impact strength are insufficient for practical requirements. It has therefore been found advantageous to improve PAS in these properties, e.g. by mixing them with other thermoplasts.

The improvement in the mechanical properties of PAS may also be achieved with mixtures of maleic acid anhydride-grafted hydrogenated diene rubbers and epoxides (JP-A 63-118369). The large quantities of maleic acid anhydride-grafted polyolefins with low glass temperatures employed improve the toughness but cannot significantly increase the flexural strength.

For certain fields of application, however, the profile of properties of such mixtures is still not quite satisfactory.

It has now been found that mixtures of polyphenylene sulphide (PPS) with nitroaryl aldehydes, electron rich aromatic compounds, glass fibres and optionally other additives are distinguished by their mechanical properties.

This invention therefore relates to mixtures of

A) 89.6 to 20% by weight of polyarylene sulphides, preferably polyphenylene sulphide, B) 0.2 to 5% by weight of a nitroarylketo compound corresponding to formula (I)

$$(O_2N)_m-Ar-(COR^1)_n \qquad (I)$$

wherein
n and m stand for 1 or 2, preferably 1,
Ar stands for a group with a valency of n+m having 6–24 carbon atoms and
$R^1$ stands for hydrogen or a $C_{1-22}$-alkyl group or a $C_{6-14}$-aryl group, preferably hydrogen, C) 0.2 to 5.0% by weight of electron rich aromatic compounds and D) 10 to 79.9% by weight, preferably 30 to 60 % by weight of glass fibres, which are preferably sized with polyurethane film formers and aminosilane or epoxysilane bonding agents, most preferably aminosilane bonding agents, and optionally up to 300% by weight, based on the PAS, of other mineral or organic fillers and reinforcing materials and/or inorganic or organic auxiliary agents.

Examples of compounds B) according to the invention include nitroarylaldehydes and ketones, e.g. 2-, 3- or 4-nitrobenzaldehyde or 2-, 3- or 4-nitroacetophenone, 3-nitrobenzaldehyde being preferred.

3-Nitrobenzaldehyde is commercially obtainable, e.g. from Ems-Dottikon.

The electron rich aromatic compounds used according to the invention are phenols, bisphenols, polyphenols and condensates of phenol with aldehydes, preferably formaldehyde, and aromatic compounds boiling above 300° C. such as, preferably, xylene-formaldehyde condensates or polyvinylphenol.

According to the invention, commercially available glass fibres preferably sized with polyurethane film formers and aminosilane or epoxysilane bonding agents are used. They have a diameter of 1 to 20 μm, preferably 5 to 13 μm. Endless glass fibres may be used and/or production processes may be employed in which the length of the fibres in the finished mixture amounts to 0.05 to 10 mm, preferably 0.1 to 2 mm. Endless fibres (rovings) may also be used in processes for the production of an endless-reinforced unidirectional composite material.

Commercially available glass spheres, e.g. Ballotini glass spheres may be used instead of the glass fibres or in particular a mixture of the two may be used.

Other mineral fillers and additives include mica, talc, quartz powder, metal oxides and sulphides, e.g. $TiO_2$, ZnO, ZnS, graphite, carbon black and fibres, e.g. of quartz or carbon, carbonates such as $MgCO_{03}$ or $CaCO_3$ or sulphates such as $CaSO_4$ or $BaSO_4$.

Pigments, mould release agents, E-waxes, fluidizing agents, nucleating agents and stabilizers are further additives which may be used.

The electron rich aromatic components C are known and in part available commercially. Examples of components C are described in Karsten, Lackrohstofftabellen, 8th Edition, R. Curt., Vincentz Verlag, Hanover, 1987.

From 0 to 300% by weight of fillers and additives, based on the quantity of PAS, may be used.

The mixtures according to the invention may be produced by extrusion in the usual manner.

The mixtures according to the invention may be worked up by the usual methods to produce moulded parts, semi-finished goods, printed circuits, fibres, films, sections, etc. It is generally advantageous to use the mixtures according to the invention wherever thermoplastically processible materials are normally used.

EXAMPLES

The mixtures according to the invention were prepared in a double shaft extruder ZSK 32 of Werner and Pfleiderer at 320° C.

The PPS used had a fusion viscosity of 45 pAS (360° C.) and a shear stress of 1000 s$-^1$ and was prepared according to EP-A 171 021.

The glass fibres, which were used in a quantity of 40% by weight, were the chopped glass fibres Bayer CS 7916$^{(R)}$ sized with polyurethane film formers and aminosilane bonding agents.

The mixtures were granulated and extruded to form test rods (e.g. measuring 80×10×4 mm). These were tested for flexural strength, edge fibre elongation, modulus of flexure and impact strength $a_n$ (reversed notched ISO 180).

COMPARISON EXAMPLE

60% by weight of PPS were mixed with 40% by weight of CS 7916.

EXAMPLE 1

50% by weight of PPS were mixed with 40% by weight of CS 7916, 1% by weight of 3-nitrobenzaldehyde and 1% of Vulkadur RB$^{(R)}$ (Novolak of Bayer AG).

EXAMPLE 2

56% by weight of PPS were mixed with 40% by weight CS 7916, 2% by weight of 3-nitrobenzaldehyde and 2% by weight of Vulkadur RB$^{(R)}$.

EXAMPLE 3

58% by weight of PPS were mixed with 40% by weight of CS 7916, 1% by weight of 3-nitrobenzaldehyde and 1% by weight of synthetic resin XF$^{(R)}$ (of Bayer AG).

The mechanical properties are summarized in the following Table.

| Example | Flexural strength (MPa) | Edge fibre elongation (%) | Modulus of Flexure (MPa) | Izod Impact strength (kJ/m$^2$) |
| --- | --- | --- | --- | --- |
| Comparison | 250 | 1.9 | 13,000 | 30 |
| 1 | 285 | 2.4 | 13,200 | 41 |
| 2 | 294 | 2.4 | 13,400 | 46 |
| 3 | 302 | 2.3 | 14,100 | 43 |

We claim:
1. Mixtures of
   A) 89.6 to 20% by weight of polyarylene sulphides
   B) 0.1 to 35% by weight of a nitroarylketo compound corresponding to formula (I)

$$(O_2N)_m-Ar-(COR^1)_n \qquad (I),$$

wherein
   n and m stand for 1 or 2,
   Ar stands for an aromatic group with a valency of (n+m) having 6–24 carbon atoms and
   R$^1$ stands for hydrogen or a C$_{1-22}$-alkyl group or a C$_{6-14}$-aryl group,
   C) 0.2 to 5.0% by weight of electron rich 5 aromatic compounds and
   D) 10 to 79.9% by weight of glass fibres which are optionally sized with polyurethane film formers and aminosilane or epoxysilane bonding agents and optionally up to 300% by weight, based on PAS, of other mineral or organic fillers and reinforcing materials and/or inorganic or organic auxiliary agents.

* * * * *